(12) United States Patent
Di Panni

(10) Patent No.: US 7,905,962 B1
(45) Date of Patent: Mar. 15, 2011

(54) APPARATUS AND METHOD FOR CLEANING, DRYING AND SANITIZING PRODUCE

(76) Inventor: Helen Di Panni, Laguna Niguel, CA (US)

(*) Notice: Subject to any disclaimer, the term of this patent is extended or adjusted under 35 U.S.C. 154(b) by 0 days.

(21) Appl. No.: 12/813,962

(22) Filed: Jun. 11, 2010

Related U.S. Application Data

(62) Division of application No. 11/447,549, filed on Jun. 5, 2006, now Pat. No. 7,748,393.

(51) Int. Cl.
*B08B 9/20* (2006.01)

(52) U.S. Cl. ............... 134/25.3; 134/25.1; 134/25.2; 134/25.5; 134/33; 134/34

(58) Field of Classification Search ............ 134/111, 134/56 R, 56 D, 57 R, 58 R, 58 D, 57 DL, 134/58 DL, 137, 138, 140, 141, 153, 157, 134/25.1, 25.2, 25.3, 25.5, 33, 34
See application file for complete search history.

(56) References Cited

U.S. PATENT DOCUMENTS

| | | |
|---|---|---|
| 2,326,356 A | 8/1943 | Haslam |
| 2,412,430 A | 12/1946 | Suelflow |
| 3,066,333 A | 12/1962 | Butter |
| 3,066,334 A | 12/1962 | Kelly |
| 3,807,636 A * | 4/1974 | Fackler .................. 239/226 |
| 4,173,051 A | 11/1979 | Reid |
| 4,601,080 A | 7/1986 | Cook |
| D300,573 S | 4/1989 | Faggard et al. |
| 5,097,855 A * | 3/1992 | Martinsson et al. ........ 134/57 D |
| 5,501,241 A | 3/1996 | Jacobson |
| 5,562,114 A * | 10/1996 | St. Martin ................ 134/111 |
| 5,752,533 A * | 5/1998 | Edwards ................. 134/176 |
| 5,858,116 A * | 1/1999 | Kim ...................... 134/25.3 |
| 6,508,257 B1 | 1/2003 | Rich |
| 6,578,590 B2 | 6/2003 | Leblond |
| 6,640,818 B1 | 11/2003 | Talisman |
| 6,871,654 B1 | 3/2005 | Berke et al. |
| 2003/0079761 A1 | 5/2003 | Rich |

* cited by examiner

*Primary Examiner* — Michael Kornakov
*Assistant Examiner* — Douglas Lee
(74) *Attorney, Agent, or Firm* — Gene Scott; Patent Law & Venture Group

(57) ABSTRACT

A produce cleaning machine provides baskets for holding large and small produce items and water sprayers for directing water jets onto the produce from above and below. One basket is motorized to rotate to more evenly clean the produce, while a further basket can be rolled in and out of the machine to make loading and unloading easier. The force of the spray is adjustable and the rotational speed of the motor is as well to provide for special handling of the produce. Rotation after cleaning is used to help dry the produce, and ultraviolet emission is used to sanitize the produce.

1 Claim, 3 Drawing Sheets

APPARATUS AND METHOD FOR CLEANING, DRYING AND SANITIZING PRODUCE

CROSS-REFERENCE TO RELATED APPLICATION

This is a Divisional application of U.S. patent application Ser. No. 11/447,549 filed Jun. 5, 2006, now U.S. Pat. No. 7,748,393 and which has a claim set directed to the apparatus of this present application.

BACKGROUND OF THE INVENTION

1. Field of the Present Disclosure

This disclosure relates generally to washing machines and more particularly to a method for washing, drying and sanitizing produce.

2. Description of Related Art Including Information Disclosed Under 37 CFR 1.97 and 1.98

Faggard et al., U.S. Pat. No. D300,573, discloses a design for a dishwasher. Rich, U.S. 2003/0079761, discloses a hands-free, electrically operated food washing and preparation device having a fluid dispenser, such as a reservoir, a wash compartment, a motor-driven agitator, a removable food basket, and a drain for removing soiled fluid from the device. Also provided is a variety of adaptable food processing attachments for the processing of food.

Haslam, U.S. U.S. Pat. No. 2,326,356, discloses a vegetable washing device comprising in combination a stationary drum adapted to receive vegetables to be washed, a water spray therein, a rotatable plate in the bottom of the drum for supporting the vegetables, ridges on the plate sloping from high portions near the circumference to low portions near its center, a rotatable brush mounted on a vertical shaft centrally of the drum above the plate, means for rotating the plate and the brush whereby the vegetables will be tumbled inwardly against the rotating brush by the ridges and sprayed during the brushing operation.

Suelflow, U.S. U.S. Pat. No. 2,412,430, discloses a vegetable washing machine having a casing provided with a support adapted for mounting upon a water tank, comprising stirrups projecting from the side walls of the washing machine casing, horizontally positioned arms slidably mounted in the stirrups, means securing the arms in an adjusted position in the stirrups; jaws at the outer ends of the arms for engagement with one edge of a water tank, and vertically disposed supporting legs adjustably secured to the casing of the washing machine adapted to rest upon the bottom of a water tank.

Butter, U.S. U.S. Pat. No. 3,066,333, discloses a multi-purpose washer having motor drive means, a main housing having an upper portion defining a tub, a rotatable container for material to be cleaned disposed in the tub and having one member of a rapid fastening means at the lower end thereof, a base for supporting the main housing and the container, a bottom and support plate in the main housing defining the bottom at the lower end of the tub and having the motor drive means secured to the lower side thereof, a drive means housing secured to the bottom of the support plate around the drive means, a plurality of rotatable studs having driving connections below the bottom side with the motor drive means and extending therefrom in sealed condition through the bottom and support plate, one of the studs having a member defining another member of the rapid fastening means adjacent to top side of the bottom and support plate and adjacent the lower end of the container for engagement with the one member and operative to support and rotate the container, and another of the studs being disposed at a lower level than the one of the studs for supporting an exchangeable rotatable upwardly extending material treating device below the lower end of the container.

Kelly, U.S. U.S. Pat. No. 3,066,334, discloses a vegetable cleaner with an outer casing, a container within the casing for the vegetables to be cleaned, the container having a bottom and a side wall, a drive plate, means mounting the drive plate for rotation horizontally below the container and connectable to be motor driven, a series of conical discs, shafts on which the discs are mounted, means mounting the shafts in the container wall with the discs disposed within the container spaced at intervals facing inward and the shafts projecting outwardly of the container, and wheels on the outward portions of the shafts engaging to be frictionally driven by the drive plate.

Reid, U.S. U.S. Pat. No. 4,173,051, discloses an apparatus for effectively washing food articles of many different varieties, especially fruits and vegetables, which conveniently can be used as a household appliance. The washing apparatus is comprised of a container for housing the food articles, an agitation system and washing system for removing undesired foreign materials from the surface of the food articles without causing bruising or damage, and a discharge system.

Cook, U.S. U.S. Pat. No. 4,601,080, discloses an apparatus for tumbling and cleaning articles such as rocks, clams, potatoes, other vegetables and fruits, and the like. The apparatus has a frame with a container mounted for free rotation thereon. The container has perimetric surfaces with numerous openings therethrough for allowing an impinging jet of water or other liquid to wash the articles and carry dirt away. Fins are advantageously provided about the container for engaging the jet of liquid to thereby rotate the container so that articles being cleaned are tumbled therein. Brushing devices are included within the container to aid in removal of soil from the articles as they tumble against the brushes.

Jacobson, U.S. U.S. Pat. No. 5,501,241, discloses a device for drying food products such as vegetables by aeration. The device includes a container having a domed cover and housing a network of tubing having a plurality of apertures through which compressed air is discharged for drying food products supported within said container in a mesh basket. The dome-shaped cover enhances air circulation by re-directing upward flowing air back down toward the enclosed food product causing certain foods such as lettuce to tumble in the resulting air stream. A pressure relief valve operates to limit pressure within the container and allow the escape of moisture laden air. In an alternate embodiment water is first allowed to flow through the tubing network and out of the tube apertures for washing the enclosed food product.

Rich, U.S. U.S. Pat. No. 6,508,257, discloses a hands-free, electrically operated food washing device having a fluid dispenser, such as a reservoir, a wash compartment, a motor-driven agitator, a removable food basket, and a drain for removing soiled fluid from the device. Also provided are controls allowing a user to vary wash cycle parameters.

Leblond, U.S. U.S. Pat. No. 6,578,590, discloses a device for cleaning and sanitizing objects such as food products, cartridge filter elements and other such objects that could benefit from the advantages of being circumferentially sprayed with a fluid or a cleaning solution or preferably a combination thereof. The present invention comprises an inner and outer housing body, a cover for the housing body, a rotative central member such as a base, axle or shaft, a rotative drive means for selectively rotating the rotative member, intake means to introduce one or more fluids or solutions individually or in combination into the interior of the housing body including a means for further pressurizing and peripherally directing the resulting spray towards a central point in a specific array, a containment means for placement of such items therein, and an outlet means to provide for the removal of fluid from the housing.

Talisman, U.S. U.S. Pat. No. 6,640,818, discloses a refrigerated automatic fruit and vegetable washer that washes fruits and/or vegetables and stores them in a cool environment after they have been washed. A portable self-contained embodiment has a cabinet that sits on a countertop and contains a water spray system and a thermoelectric cooling system and sits on a kitchen countertop and has water inlet and drain hoses releasably connected to the sink faucet. Another self-contained embodiment fits into a lower storage compartment of a refrigerator and can be removed and placed on the countertop for the washing operation. A built-in cabinet embodiment is permanently installed in the kitchen. A wash-only embodiment is slidably received in the lower portion of a refrigerator in place of the existing vegetable crisper to be cooled by the refrigerator cooling system and is removed therefrom and placed on a countertop for the washing operation. The fruit and vegetable washer may also be built into a refrigerator as an integral component of the refrigerator.

Berke et al., U.S. U.S. Pat. No. 6,871,654, discloses a sonic fruit and vegetable washer for removing inorganic impurities and pathogens from a variety of raw fruit and vegetables. The sonic fruit and vegetable washer is comprised of a housing, a removable basket, a liquid dispenser, a filter, a sonic generator, a spray head, hydraulic values, electrical controls, a blower, and a heating element. The washer is connected to an existing faucet, and drains into a conventional kitchen sink. During a typical operation, the controls are adjusted for a particular fruit or vegetable, a fruit or vegetable is loaded into the basket, and a small amount of a preservative, cleaning agent, sweetener or vitamin or mineral is added and electrical power is applied. Water enters the washer, is filtered, and one or more wash and rinse cycles are completed. The sonic generator is active during the wash and rinse cycles to remove and flush contaminants from the washer. Thereafter, a drying cycle is completed.

Corazza, WO 99/35945, discloses an apparatus for washing vegetable foodstuffs, comprising agitator means for bringing about relative motion between the vegetables immersed in a washing fluid and the washing fluid itself, characterized in that the agitator means comprise a compressed-air generator and a diffuser which diffuses the air in the washing fluid and which can be placed in the fluid beneath the vegetables being treated so that the compressed air bubbling through the fluid brings about the relative motion.

The related art described above discloses produce washers. However, the prior art fails to disclose such a washing machine with a rotating spray arm positioned between upper and lower baskets and capable of spraying both baskets simultaneously. The present disclosure distinguishes over the prior art by such method step providing heretofore unknown advantages as described in the following summary.

BRIEF SUMMARY OF THE INVENTION

This disclosure teaches certain benefits in construction and use which give rise to the objectives described below.

A fruits and vegetables washing machine providing upper and lower baskets for holding produce and upper, mid, and lower spray arms for directing water to the produce from above and below. The upper basket is motorized to rotate so as to more evenly clean the produce, while the lower basket can be rolled in and out of the machine to make loading and unloading easier. The force of the spray is adjustable and the rotational speed of the motor is as well to provide for special handling of the produce. An enclosure provides a door mounted for rotating about a hinge into a horizontal attitude extending away from the enclosure and thereby forming a support platform for the lower produce basket. A dual function conduit delivers water and electrical power to a top, central and lower stationary valves, which are fixedly supported so as to deliver water to central hubs and thereby to the spray arms. The spray arms are positioned for directing water jets at an angle suitable for propelling the arms and central hubs in rotational motion about the stationary valves. An upper spray are directs the water jets primarily downwardly, a centrally positioned spray are directs the water jets both upwardly and downwardly at the same time, and a lower positioned spray arm directs the water jets primarily upwardly. This provides comprehensive cleaning action within the upper basket which is positioned for receiving the water jets from the top and central spray arms, while a lower basket mounted on wheels in a lower space within the enclosure is positioned for receiving the water jets from the central and lower spray arms. An ultraviolet emitter is used to sanitize the produce. Several washing, spin drying and sanitizing cycles are selectable at a controller.

A primary objective inherent in the above described apparatus and method of use is to provide advantages not taught by the prior art.

Another objective is to provide a produce washer that has a wash cycle, a spin dry cycle and a sanitizing cycle.

A further objective is to provide control over water pressure impingement from above and below produce held in wire baskets.

A still further objective is to provide such a machine providing a slow rotation of the produce during washing, and faster rotation during drying cycles.

A still further objective is to provide such a machine that is able to spray produce from above and from below at the same time.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
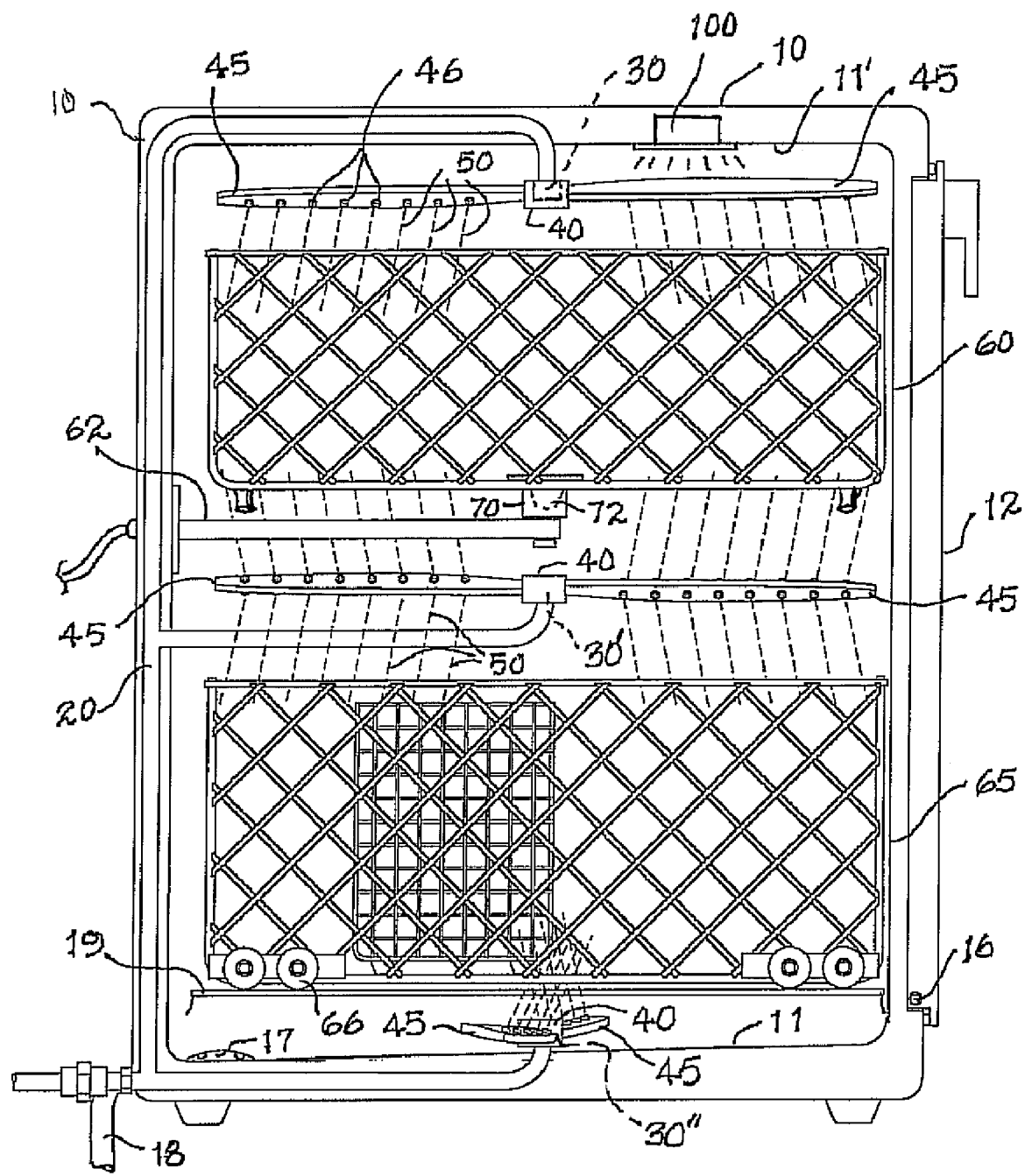
FIG. 1 is a side elevational view of the presently described apparatus shown with the near wall removed so as to disclose interior details of an enclosure of the apparatus and further showing how water jets are sprayed on two baskets which are used or holding produce during cleaning, drying and sanitizing operations.
Figure 2:
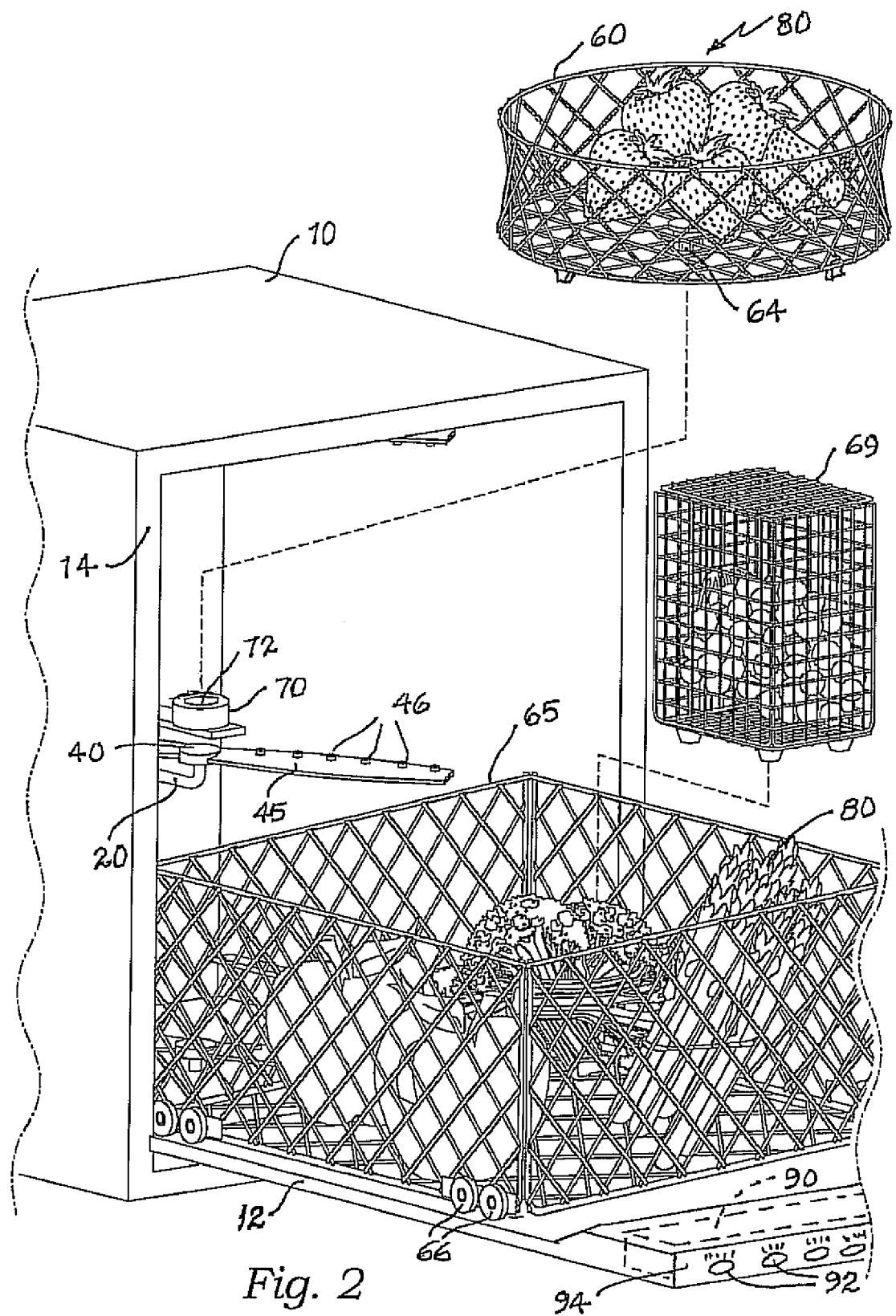
FIG. 2 is a partial perspective view thereof shown with baskets of the apparatus removed or withdrawn from the apparatus.
Figure 3:
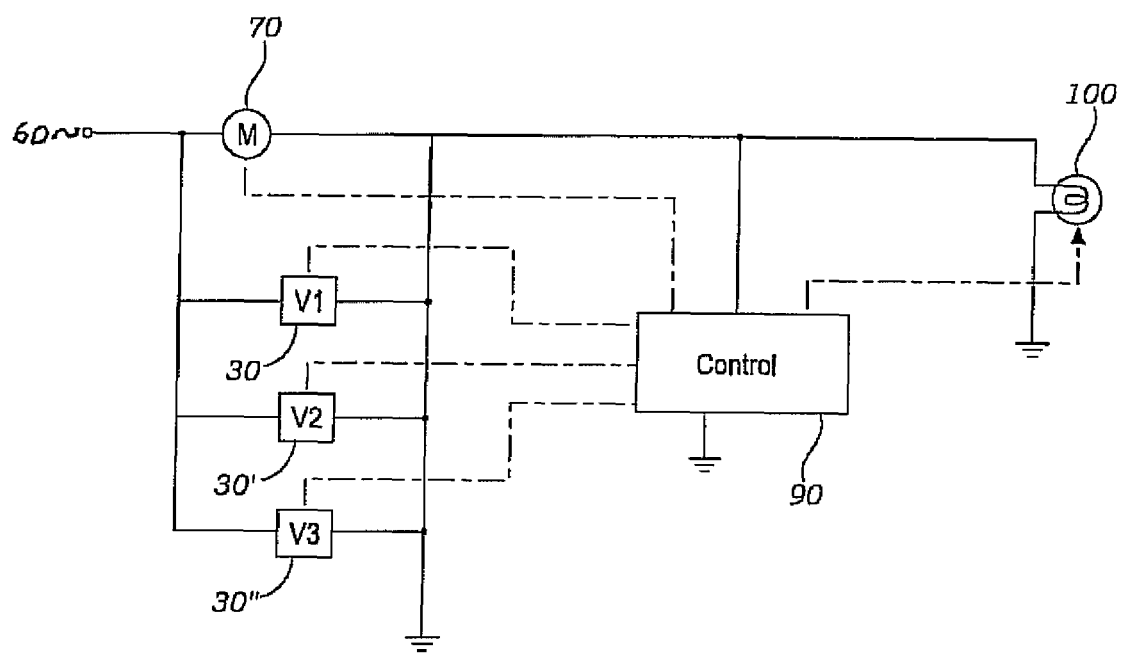
FIG. 3 is an electrical schematic diagram thereof showing power conductor paths with solid lines and control signal conductor paths with broken lines.

Described now in detail is an apparatus and method for cleaning and sanitizing produce. As shown in FIG. 1, the apparatus comprises an enclosure 10 having a door 12 which forms a front wall of the enclosure 10. The door 12 is mounted for rotating about a hinge 16 into a horizontal attitude extending away from the enclosure 10 and thereby forming a support platform as shown in FIG. 2. A dual function conduit 20 delivers water and electrical power to a top stationary valve 30 (V1), a central stationary valve 30' (V2) and a bottom stationary valve 30" (V3), as shown in FIGS. 1 and 3. The stationary valves V1-V3 are fixedly supported by the dual function conduit 20 so as to deliver water to central hubs 40 and thereby to pairs of horizontally oriented spray batons or arms 45. The valves 30, 30' and 30" are controlled by a control 90 (FIGS. 2 and 3) which may be any common type well known in the art, and which is preferably of the type described in U.S. U.S. Pat. No. 6,871,654 to Berke et al or U.S. U.S. Pat. No. 6,508,257 Rich, both of which are hereby incorporated herein by reference. The control 90 is able to adjust each of the valves V1-V2 independently from a no flow condition, to maximum flow, and such settings are established in specific machine cycles stored in the control 90 and selectable by the operator controls 92. Examples of these programs will be described below.

The spray batons 45 each provide plural spray nozzles 46 positioned for directing water jets 50 at an angle suitable for propelling the batons 45 in rotational motion about the stationary valves 30, 30', 30". Developing rotational driving force by water jet directing is well known in the art. As shown in FIG. 1, an upper positioned set of the spray nozzles 46 direct the water jets 50 primarily downwardly, while a centrally positioned set of the spray nozzles 46 direct the water jets 50 simultaneously upwardly and downwardly, and a lower positioned set of the spray nozzles 46 direct the water jets 50, primarily upwardly.

An upper basket 60 is mounted on a standoff arm 62 in an upper space within the enclosure and is positioned for receiving the water jets 50 from an upper and a central spray arms 45. A lower basket 65 is mounted on plural wheels 66 in a lower space within the enclosure and is positioned for receiving the water jets 50 from the central and lower spray arms 45.

The enclosure 10 has a floor surface 11 slanted rearwardly in the enclosure and a drain grating 17 positioned rearwardly for receiving water from the floor surface 11, the drain grating directing the water into a drain system 18 which is not a part of the invention. The enclosure 10 also provides a pair of opposing ridges 19, one of which is shown in FIG. 1, positioned for receiving the wheels 66 of the lower basket 65 for supporting the lower basket 65 thereon. The door 12 supports the lower basket 66 in rolling motion into and out of the enclosure 10 when the door 12 is in the horizontal attitude, as shown in FIG. 2.

Referring again to FIG. 1, the standoff 62 supports a motor 70, the motor 70 providing a non-round recess 72 for receiving an axle 64 engaged with, and extending downwardly from the upper basket 60, the axle engaging the non-round recess 72 for engaging the basket 60 with the motor 70 enabling the motor 70 to drive the axle 64 (see FIG. 2) and upper basket 60 in rotational motion for spin-drying produce 80 within the upper basket 60, the motor speed controlled by the controller 90.

In the preferred embodiment, an ultraviolet light emitter 100, a lamp or similar device, is mounted for directing such energy toward the produce 80. In the present disclosure, the emitter 100 is mounted in a ceiling surface 11' of the enclosure 10 and directs its energy downwardly toward the baskets 60 and 65. Such emitters may be mounted in plural locations within the enclosure 10 so as to more fully cover all surfaces of the produce 80 in both the upper 60 and the lower 65 baskets. The emitter 100 is capable of killing pathogens that may remain on the surfaces of the produce after it has been washed and therefore provides sanitization.

As stated, the control 90 is engaged for controlling the valves 30, 30', 30", and the motor 70, and it also controls the ultraviolet emitter 100. The control 90 is preferably mounted within the door 12 as shown in FIG. 2 and provides operator's controls 92 preferably positioned in an upper edge of the door 94. Such controls 92 are able to select a cleaning cycle of choice or can be used to program a custom cycle. The motor 70 may be set to one of several pre-programmed speeds such as slow, medium and fast, or it may be set to a percent of maximum speed for a custom cycle. The valves V1-V3 may be set to open during all or any part of a cycle for low, medium and high flow rate, or may be selected to open for admitting a percentage of a maximum flow rate. The ultraviolet emitter 100 may be programmed to operate during any portion of the custom cycle or only at the end of a washing and/or washing and drying cycle. In this manner, the present apparatus is able to meet the needs of most cleaning and sanitizing operations for small or large produce items.

In addition to the upper 60 and lower 65 baskets, a small basket 69 may be used with the present apparatus, as shown in FIG. 2. This basket 69 is used for small items such as cherry tomatoes, radishes and grapes and is placed within the lower basket 65 during washing cycles. Of course, our meaning herein is not to limit the number of baskets to two or three, but any number of such baskets may be employed. Each of the baskets defined herein may be comprised of two or more individual or separate basket portions.

The method for washing produce (fruits and vegetables) using the above described apparatus includes delivering water and electrical power to the motor 70 and the valves V1-V3 within the enclosure 10. Such a delivery system (conduit 20) may be a single tube carrying water and a further single tube carrying electrical wires. The conduit 20 may also be a pair of tubes mounted coaxially with electrical wires in the center and water flowing in the outer space. Water and electricity are conducted to each of the valves V1-V3. Power is also delivered to the motor 70 and ultraviolet emitter 100. Clearly, control voltages are also delivered to each of these devices to set operating conditions. FIG. 3 shows such an electrical arrangement in schematic form and one of skill in this art will be able to enable such a control system using standard operating and control elements. Operating the apparatus to meet the objectives described above involves mounting the upper basket 60 with produce therein onto the motor 70, mounting the lower basket 65 by rolling it into the enclosure 10 on the ridges 19, with further produce placed therein, and operating rotating spray nozzles 46 above the upper basket 60, between the upper basket 60 and the lower basket 65, and below the lower basket 65 to wash the produce. The method also provides for controlling water flow rates through the valves V1-V3 to control water impingement forces, and also controlling the rotational speed of the motor 70 for effectively washing and drying the produce 80 through a selected one of a plurality of washing cycles which are stored in the controller 90.

Preferably, one of the washing cycles comprises no water flow through the upper valve 30 and selected water flow rate in the central valve 30' and a lower valve 30" for washing produce 80 in only the lower basket 65.

Preferably, one of the washing cycles comprises a washing step including no water flow in the lower valve 30" and a selected water flow in the central 30' and upper valves 30 with the motor 70 set for low rotational speed, for washing produce in only the upper basket 60.

Preferably, one of the washing cycles comprises a dry-off step following the washing step, the dry-off step including zero water flow, and setting the motor 70 to high rotational speed. Drying occurs by forcing water to move outwardly as in a centrifuge. This step may be followed by a period of time devoted to ultraviolet exposure to assure sanitizing of the produce.

Preferably, one of the washing cycles is a washing step including selected water flow rates in each of the valves and the motor set for low rotational speed, for washing fruits and vegetables in both the upper and lower baskets, followed by a dry-off step establishing zero water flow rate in all valves and a high motor rotational speed. The rotational speed of the motor 70 is set for thorough cleaning of produce by a selected impingement force due to water flow rate. For instance, if the produce has highly resistant soils on it, the impingement force is set higher and the motor rotation is set lower. If soils are easily removed and/or the produce is easily damaged, the rotational rate is set higher and the impingement forces are set lower by lower water flow rate. Also, for heavy soils, the cycle time may be increased, while for light soils or merely wishing to rinse the produce, the cycle time is reduced. Preferably, the user has full control of water flow rate at each valve, motor speed rate, ultraviolet emitter cycle time, and overall cycle time.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A method of washing produce in a produce washer comprising:
   supporting a motor in the produce washer between an upper basket and a lower basket, the motor mounted on a standoff delivering electrical power thereto;
   providing a recess in the motor;
   placing the upper basket, with produce therein, on top of the motor and engaging a downwardly extending axle of the upper basket within the motor recess;
   operating the motor to drive the axle and upper basket in rotational motion thereby exposing the produce to water spray from spray arms within the produce washer.

* * * * *